United States Patent [19]
Civlin et al.

[11] Patent Number: 6,145,125
[45] Date of Patent: Nov. 7, 2000

[54] METHOD AND STORAGE MEDIUM FOR BUILDING VERY LARGE EXECUTABLE PROGRAMS

[75] Inventors: Jan Civlin; Gadi Haber; Bilha Mendelson; David Bernstein; Itai Nahshon, all of Haifa, Israel

[73] Assignee: International Business Machines Corporation, Armonk, N.Y.

[21] Appl. No.: 09/190,166

[22] Filed: Nov. 12, 1998

[51] Int. Cl.[7] ........................................................ G06F 9/42
[52] U.S. Cl. ................... 717/10; 717/9; 712/213
[58] Field of Search ................ 712/213; 717/9, 717/10

[56] References Cited

U.S. PATENT DOCUMENTS

| | | | |
|---|---|---|---|
| 5,784,605 | 7/1998 | Ando | 712/238 |
| 5,842,008 | 11/1998 | Gochman | 712/240 |
| 5,850,552 | 12/1998 | Odani | 717/9 |
| 6,064,819 | 5/2000 | Franssen | 717/9 |
| 6,081,665 | 6/2000 | Nilsen | 395/705 |

*Primary Examiner*—Eric Coleman
*Attorney, Agent, or Firm*—Browdy and Neimark

[57] ABSTRACT

A method for effecting a direct jump in an executable program module to a target address displaced from a source address by a specified distance that is greater than a maximum permitted range. During program linkage the direct jump is split into at least two component direct jumps each no greater than the maximum permitted range, thus allowing the direct jump to be achieved by jumping sequentially from the source address to the target address via each of the component direct jumps. A storage medium for storing data representative of the executable program module contains at least one trampoline for performing the component direct jumps.

6 Claims, 3 Drawing Sheets

METHOD AND STORAGE MEDIUM FOR BUILDING VERY LARGE EXECUTABLE PROGRAMS

FIELD OF THE INVENTION

This invention relates to memory management of computer programs.

BACKGROUND OF THE INVENTION

Regardless of the size of a computer and, in particular, of its internal memory, there are always some practical limits to the size of program which it can run. One such limit is imposed by the maximum direct jump which may be allowed in an executable module in order to carry out instructions usually relating to a module which is linked into the executable module at link time. In such cases, at the initial stage of compilation, upon detecting a reference to another module, the compiler does not know the address at which the other module will be referenced. It is therefore normal procedure to leave a vacancy in the compiled code for accommodating a direct jump to a new address, so that during linking, the appropriate address can be inserted into the vacancy. If when the linker attends to the linkage of external modules, the required direct jump which must be inserted into the vacancy in the main code exceeds the maximum permitted direct jump, there is currently no straightforward way in which the program can be compiled successfully.

The maximum permitted range (otherwise known as "branch scope") which may be achieved by a single direct jump is dependent on the number of bits which are allocated for referencing a target address. Thus, at the level of assembler code, each jump instruction includes an opcode (jmp) followed by the target address to which the program must branch. Typically, two or three bytes are reserved for referencing the target address and therefore any target address which is so large that it cannot be represented by these two bytes, simply cannot be reached. For the sake of completeness, it should be noted that direct jumps contemplate both absolute and relative jumps. Relative jumps move the program counter to a target address location which is displaced from the source address by a specified value. In distinction thereto, absolute jumps specify the target address absolutely. Usually, relative jumps are of short range and the required displacement can therefore be stored without problem. However, relative jumps are not constrained to operate over short ranges only, and it might therefore occur that the displacement required for a relative direct jump exceeds the maximum permitted range.

It follows from the above that computer programs can be compiled only to the extent that the maximum direct jump in the compiled program may be accommodated in the permitted address space. This may also have ramifications when patching existing programs which utilize the same address space in order to add features not contemplated when the program was originally compiled. Patching usually requires that the executable module be modified by adding a code segment whose start address usually follows immediately after the last instruction in the executable module. In general, this requirement can be expressed as follows. Suppose X denotes the size of a given code segment i in the input executable, and let Y be the size of code segment j in this executable. Let R denote the maximum permitted range of direct branch instruction. If X+Y>R, then the segment j cannot be allocated in a way that its addresses are accessible with a single direct branch from the code segment i. For instance, if X/2+Y/2 exceeds R, then the higher half of segment j is allocated beyond the area that is accessible by a single direct branch from the lower half of segment i.

This constraint is escalating as programs grow in size since currently available linkers are not equipped to handle direct branch instructions which extend beyond the branch scope. It should be noted that even the recognition that a desired branch extends the branch scope is a much more involved process during linking than it is during patching, regardless of what steps are then taken to sidestep the problem. During patching, the complete code is intact and therefore the length of any branch is easily determined. This is far from the case when several compiled program modules are rendered into a composite executable module by the linker. It is clearly much more difficult in this case to know in advance whether a branch statement will require a jump that exceeds the branch scope, let alone take corrective action., Normally what happens is that the linker either fails or the program crashes during execution.

For the sake of completeness, it should further be observed that the program counter can also be advanced using indirect jumps. In this case, following the opcode there is given an address of a register which itself contains the target address. Since the register is not limited in size to the number of bytes allocated to the register address, the target address is not limited to the maximum permitted range. Thus, indirect addressing appears to offer a solution to the problem with which the invention is concerned. However, indirect addressing is not always suitable because it imposes the overhead of requiring an additional dedicated register. Not all registers can serve this purpose and therefore the number of registers which may be used for indirect addressing is limited. It may therefore be the case that no registers are available for storing the target address of a particular indirect jump. Thus, whilst it might appear superficially that indirect jumps always provide an acceptable solution to the limited maximum range of direct jumps, in practice this is not the case.

SUMMARY OF THE INVENTION

It is therefore an object of the invention to provide a method for allowing direct branches in executable programs to extend beyond the maximum permitted range.

This object is realized in accordance with a first aspect of the invention by a method for effecting a direct jump in an executable program module to a target address displaced from a source address by a specified distance that is greater than a maximum permitted range, the method comprising:

(a) during program linkage splitting the direct jump into at least two component direct jumps each no greater than the maximum permitted range, and (b) jumping sequentially from the source address to the target address via each of said component direct jumps.

In practice, the invention is implemented by embedding intermediate jumping platforms, which will be referred to as "trampolines", for effecting the direct jump in stages each within the maximum permitted memory range of the computer.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figures 1A, 1B:
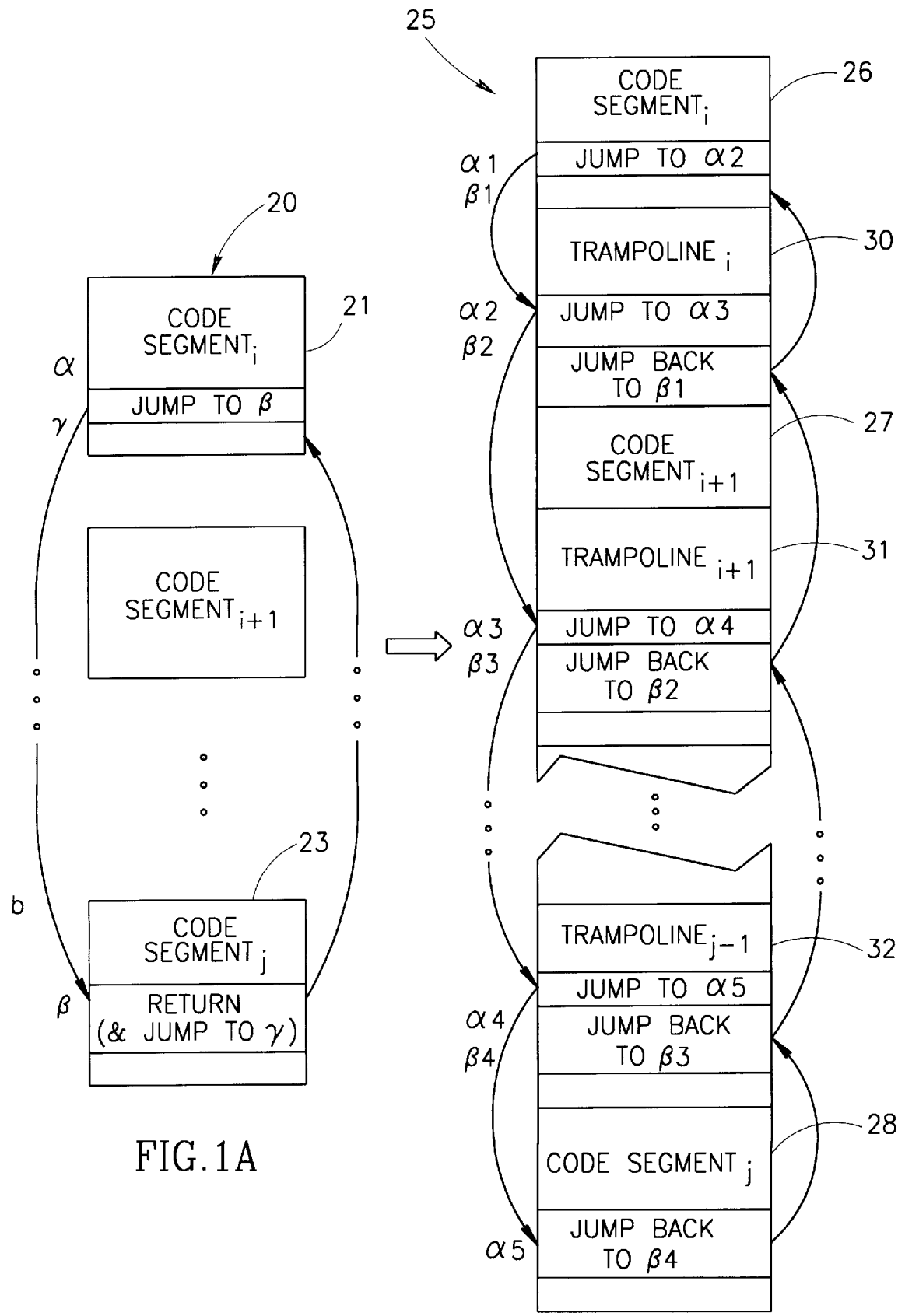
FIGS. 1a and 1b show schematically a program memory containing multiple code segments allowing a direct jump which exceeds a maximum permitted range.

FIG. 1a shows schematically a program memory 20 comprising a plurality of code segments of which there are shown three labeled 21, 22 and 23 having indices i, (i+1) and j, respectively. The $i^{th}$ code segment 21 includes an instruction for jumping from and address α (constituting a source address) in the $i^{th}$ code segment 21 to an address β (constituting a target address) in the $j^{th}$ code segment 22 for carrying out a segment of code therein, whereafter control returns to the $i^{th}$ code segment 21 immediately after the direct jump statement by jumping backward to an address γ immediately following the address α. As noted above, the compiler and linker have no problem doing this so long as the distance from the source address to the target address does not exceed a maximum permitted range which is a function of the computer architecture on which the code is executed. If, on the other hand, the distance from the source address to the target address exceeds the branch scope, then trampolines are inserted as will now be described with reference to FIG. 1b.

FIG. 1b shows schematically a program memory 25 containing an executable module comprising a plurality of code segments of which there are shown three labeled 26, 27 and 28 having indices i, (i+1) and j, respectively. There are further incorporated within the memory 25 a plurality of so-called "trampolines" of which there are shown three labeled 30, 31 and 32 having indices i, (i+1) and (j−1), respectively. Here again, it is desired to branch from a source address $\alpha^1$ in the $i^{th}$ code segment 26 to a target address $\alpha^5$ in the $j^{th}$ code segment 28. Thus, the source address $\alpha^1$ corresponds to in FIG. 1a and the target address $\alpha^5$ corresponds to β in FIG. 1a. However, in this case, it is assumed that the total direct jump thus required (i.e. $\alpha^5-\alpha^1$) exceeds the maximum range R permitted by the computer. The manner in which the direct jump is performed will now be explained.

At the source address $\alpha^1$ in the $i^{th}$ code segment 26, there is encoded a first direct jump (constituting a first component direct jump) to a first intermediate address $\alpha^2$ within the $i^{th}$ trampoline 30. The instruction at the first intermediate address $a^2$ in the $i^{th}$ trampoline 30 jumps forward to a second intermediate address $\alpha^3$ within the $(i+1)^{th}$ trampoline 31. The instruction immediately after the address $\alpha^2$ in the $i^{th}$ trampoline 30 starts at an address $\beta^2$ and jumps backward to the address $\beta^1$ in the $i^{th}$ code segment immediately following the source address $\alpha^1$.

The instruction at the second intermediate address $\alpha^3$ in the $(i+1)^{th}$ trampoline 31 jumps forward to a third intermediate address $\alpha^4$ within the $(j-1)^{th}$ trampoline 32. The instruction immediately following the address $\alpha^3$ in the $(i+1)^{th}$ trampoline 31 starts at an address $\alpha^3$ and jumps backward to the address $\beta^2$ in the $i^{th}$ trampoline 31 immediately following the first intermediate address $\alpha^2$.

The instruction at the third intermediate address $\alpha^4$ in the $(j-1)^{th}$ trampoline 32 jumps forward to the target address $\alpha^5$ within the $j^{th}$ code segment 28. The instruction immediately following the address $\alpha^4$ in the third trampoline 31 starts at an address $\beta^4$ and jumps backward to the address $\beta^3$ in the $(j-1)^{th}$ trampoline 32 immediately following the first intermediate address $\alpha^3$.

The manner in which the executable module branches from the source address $\alpha^1$ in the $i^{th}$ code segment 26 to the target address $\alpha^5$ in the $j^{th}$ code segment 28 is as follows. When source address $\alpha^1$ is reached in the $i^{th}$ code segment 26, control branches forward successively to address $\alpha^2$ in the $i^{th}$ trampoline 30, to address $\alpha^3$ in the $(i+1)^{th}$ trampoline 31, to address $\alpha^4$ in the $(j-1)^{th}$ trampoline 32, and finally to the target address $\alpha^5$ in the $j^{th}$ code segment 28. Upon executing the code there, control now branches backward successively to address $\beta^4$ in the $(j-1)^{th}$ trampoline 32, to address $\beta^3$ in the $(i+1)^{th}$ trampoline 31, to address $\beta^2$ in the $i^{th}$ trampoline 30, and finally to the address immediately following the source address $\alpha^1$ in the $i^{th}$ code segment 26.

Thus a collection of trampolines is inserted within the executable module, each trampoline being associated with a corresponding code segment. By such means, a branch from any one code segment to any other code segment may always be effected by inserting appropriate intermediate direct jump statements in the trampolines and jumping forwards across successive trampolines. In like manner, control to the statement which immediately follows the source address may be resumed by jumping backwards across the intermediate trampolines.

The insertion of the trampolines is effected in the following manner. First, the code segments are compiled thus producing corresponding compilation units. The target addresses of all jump statements are then resolved. After each compilation unit, address space is reserved for accommodating a trampoline. The trampolines are all of equal size and therefore the same address space is reserved for each trampoline. At this stage, no data is yet associated with any of the trampolines. Therefore, for each direct jump whose target address is not in the same compilation unit (constituting a "distant jump"), all of the trampolines must now be populated with the appropriate jump instructions and target address data.

Figure 2:
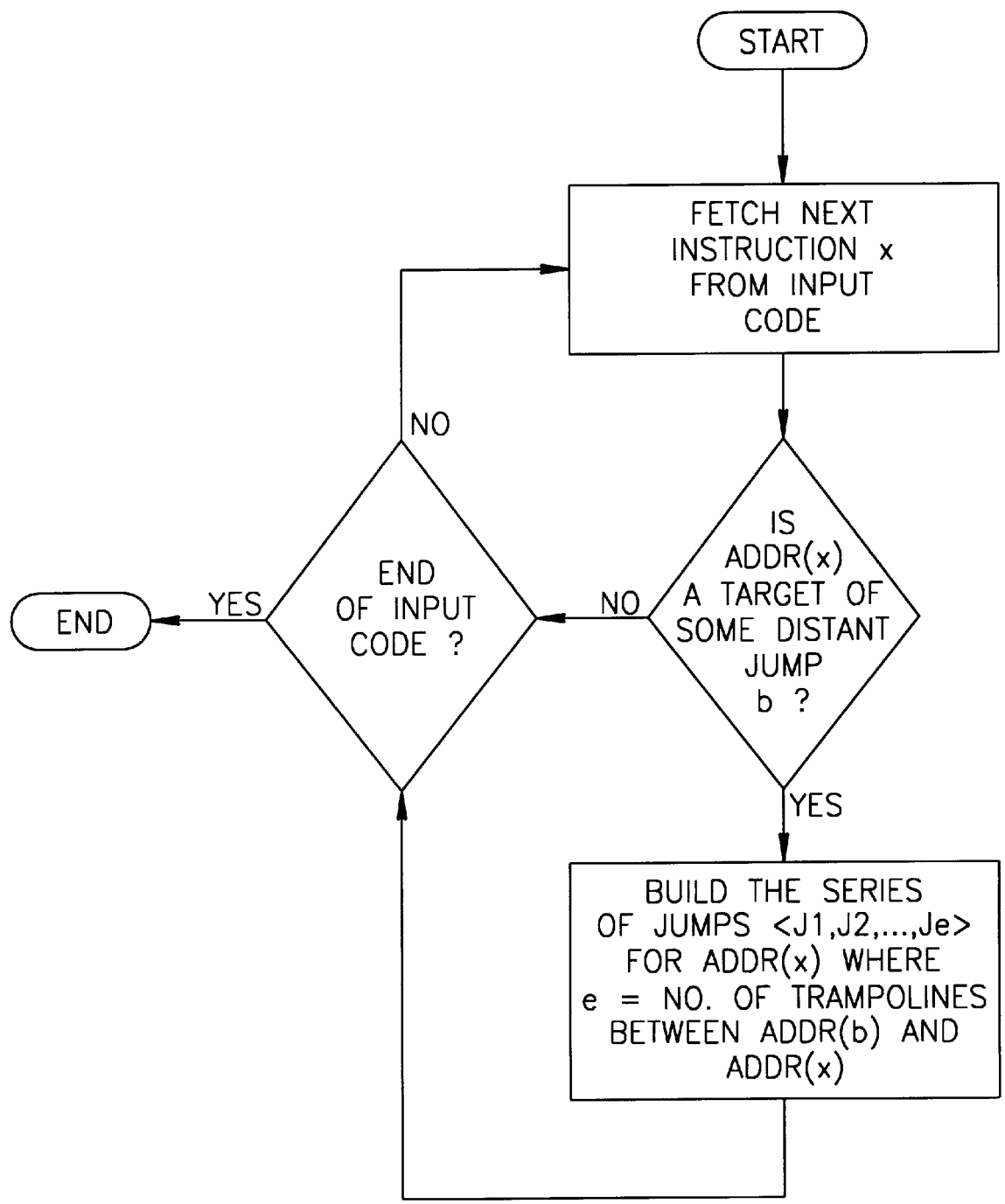
FIG. 2 is a flow diagram showing a method for populating the trampolines during program linkage.

FIG. 2 is a flow diagram showing a method for populating the trampolines during program linkage. Each successive instruction x is fetched from the input code. If its address is accessible by a direct jump within the maximum permitted range, no action is required and the next successive instruction is fetched. Otherwise, if the address of the next instruction is remote and requires a jump exceeding the maximum permitted range allowed by a direct jump, then a series of direct jumps is inserted into the code whereby the desired direct jump can be effected via two or more component direct jumps between trampolines. Thereafter, all that remains to be done is to insert the appropriate addresses in the trampolines so that, during run time, the required direct jump will be performed. It will be understood that multiple forward and backward branch statements can be incorporated in each trampoline, so as to allow for multiple branch statements to be accomplished, each by a different distance.

Figures 3A, 3B:
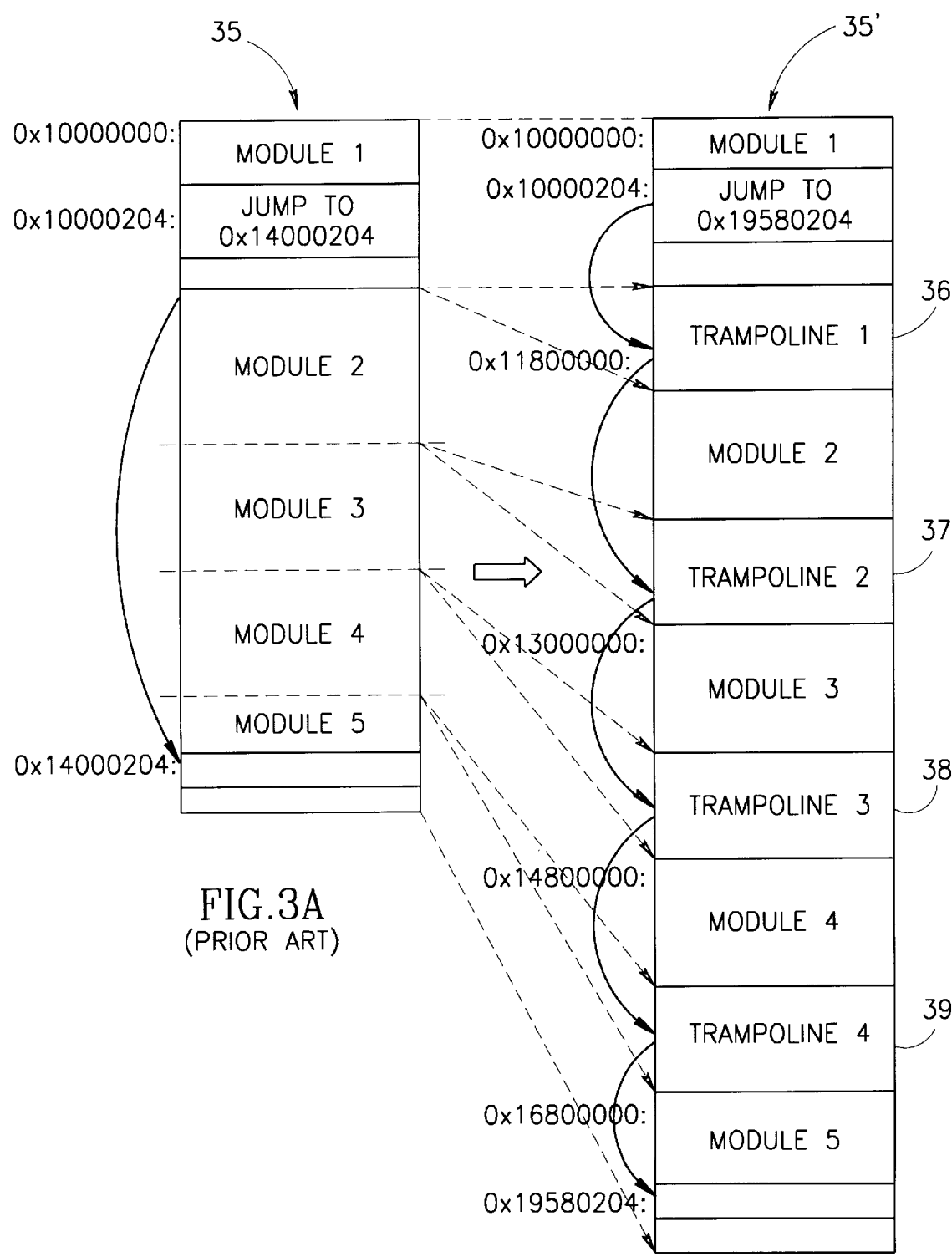
FIG. 3a shows schematically a prior art program memory comprising five object modules prohibiting a direct jump which exceeds a maximum permitted range.
FIG. 3b shows schematically a program memory comprising the same five object modules in conjunction with trampolines for allowing a direct jump which exceeds a maximum permitted range.

FIGS. 3a and 3b show schematically respective program memories 35 and 35' comprising five object modules running on an IBM RS/6000 machine under the AIX operating system. The original unmodified linked executable shown in FIG. 3a was 97 MB in size. FIG. 3b shows the modified linked code according to the invention. Four trampolines 36, 37, 38 and 39 were implemented into the linkage process using the trampoline scheme described above with reference to FIG. 1a, 1b and 2 of the drawings. The four trampolines 36, 37, 38 and 39 were each approximately 5 MB in size, i.e. a total of 21 MB. As seen in the figure in which all addresses are denoted in hexadecimal, the original code started at address 100000000 and the instruction at address 100000204 jumps to address 140000204 which cannot be reached with a single direct jump owing to machine constraints.

The program memory 35' shown in FIG. 3b shows the modified code wherein the four trampolines 36, 37, 38 and 39 include landing stations at addresses 11800000, 13000000, 14800000 and 16800000. The code implemented at these addresses in each of the first, second and third trampolines jumps to the corresponding address in the successive trampoline, as explained above. Each of the trampolines is equal in size to 560,000. Therefore, all four trampolines together occupy an additional memory space equal in size to (4×560,000) which, of course, was not present in the original memory 35. Thus, the instruction at memory address 14000204 in the original memory 35 will now appear at address 14000204+(4×560,000) in the memory 35' containing the extended code. Therefore, the instruction that must be inserted at address 16800000 in the third trampoline 38 jumps to address 14000204+(4×560,000) in order to reach the desired instruction.

The invention contemplates not only the particular method for effecting remote direct jumps that would normally be considered out of range, but the realization that such direct jumps may, in fact, be implemented. It will be appreciated further that the invention contemplates a storage medium allowing such direct jumps and, in particular, containing data incorporating therein one or more trampolines. In this context, it is to be noted that the term "data incorporating" is not bound to any particular organization of data.

It will also be understood that not necessarily are all trampolines in the extended code active for all direct jumps. Thus, some direct jumps may be just beyond the maximum permitted range whilst others may be displaced well beyond the maximum permitted range. In this case, the number of trampolines which are implemented must allow for the maximum direct jump although higher order trampolines may not be active so far as smaller direct jumps are concerned.

What is claimed is:

1. A method for effecting a direct jump in an executable program module to a target address displaced from a source address by a specified distance that is greater than a maximum permitted range, the method comprising:

(a) during program linkage splitting the direct jump into at least two component direct jumps each no greater than the maximum permitted range, and (b) jumping sequentially from the source address to the target address via each of said component direct jumps.

2. The method according to claim 1, wherein step (a) includes:

(i) inserting between different code segments of the executable program module a trampoline containing a branch instruction for performing a respective one of the component direct jumps.

3. The method according to claim 2, wherein step (i) of inserting trampolines includes:

(ii) compiling the code segments thus producing corresponding compilation units, (iii) resolving the target addresses of all jump statements, (iv) reserving address space after each compilation unit for accommodating therein a trampoline, (v) for each direct jump in a compilation unit whose target address is not in the same compilation unit, populating all of the trampolines with an appropriate jump instruction and target address data.

4. The method according to claim 2, for effecting a direct jump in an executable program module during linkage to an instruction at the target address and wherein the direct jump is achieved via one or more of said trampolines having a known combined address space, the method further comprising:

(ii) jumping to an address which is equal to the target address plus said combined address space.

5. A storage medium which stores data incorporating a trampoline generated according to claim 2.

6. A storage medium which stores data incorporating a direct jump which is greater than a maximum permitted range.

* * * * *